US009718245B2

(12) United States Patent
Jang

(10) Patent No.: US 9,718,245 B2
(45) Date of Patent: Aug. 1, 2017

(54) COMBINATION APPARATUS OF COLD ISOSTATIC PRESS AND GENERAL PRESS

(71) Applicant: ENERGYN INC., Incheon (KR)

(72) Inventor: Jin Suk Jang, Incheon (KR)

(73) Assignee: ENERGYN INC., Incheon (KR)

( * ) Notice: Subject to any disclaimer, the term of this patent is extended or adjusted under 35 U.S.C. 154(b) by 108 days.

(21) Appl. No.: 14/388,238

(22) PCT Filed: Mar. 18, 2013

(86) PCT No.: PCT/KR2013/002157
§ 371 (c)(1),
(2) Date: Sep. 25, 2014

(87) PCT Pub. No.: WO2013/147444
PCT Pub. Date: Oct. 3, 2013

(65) Prior Publication Data

US 2015/0165710 A1 Jun. 18, 2015

(30) Foreign Application Priority Data

Mar. 26, 2012 (KR) ........................ 10-2012-0030732

(51) Int. Cl.
*B29C 43/02* (2006.01)
*B29C 43/10* (2006.01)
(Continued)

(52) U.S. Cl.
CPC .............. *B30B 11/002* (2013.01); *B22F 3/03* (2013.01); *B22F 3/04* (2013.01); *B30B 1/24* (2013.01); *B30B 1/32* (2013.01); *B30B 15/042* (2013.01)

(58) Field of Classification Search
CPC ... B30B 11/002; B30B 11/005; B30B 11/007; B30B 1/24; B29C 43/02; B29C 43/10
(Continued)

(56) References Cited

U.S. PATENT DOCUMENTS 3,584,336 A * 6/1971 Von Platen .............. B01J 3/065 425/77
4,582,212 A * 4/1986 Asari ....................... B01J 3/048 425/77
(Continued)

FOREIGN PATENT DOCUMENTS

JP 01-162598 A 6/1989
JP 06-015897 U 3/1994
(Continued)

*Primary Examiner* — Joseph S Del Sole
*Assistant Examiner* — Thukhanh T Nguyen
(74) *Attorney, Agent, or Firm* — Novick, Kim & Lee, PLLC; Jae Youn Kim

(57) ABSTRACT

Provided is a combined cold isostatic press and general press capable of simultaneously performing cold isostatic pressing using pressure of fluid and general pressing using mechanically applied pressure. The combined cold isostatic press and general press includes a main frame having a center penetration region, a pressure vessel supported by the penetration region of the main frame, the pressure vessel performing cold isostatic pressing using fluid injected therein, a top lid installed to be vertically slidable from or to an upper end of the pressure vessel by the fluid filled in the pressure vessel so as to function as piston, the top lid being configured to open or close the upper end of the pressure vessel, a lower lid configured to open or close a lower end of the pressure vessel and a press unit located between the top lid and the main frame to perform pressing using pressure applied by the top lid as the top lid slides from the pressure vessel. As such, enhanced productivity and reduction in fluid consumption and manufacturing costs may be accomplished.

17 Claims, 9 Drawing Sheets

(51) Int. Cl.

| | |
|---|---|
| ***B30B 11/00*** | (2006.01) |
| ***B22F 3/04*** | (2006.01) |
| ***B30B 1/32*** | (2006.01) |
| ***B30B 15/04*** | (2006.01) |
| ***B22F 3/03*** | (2006.01) |
| ***B30B 1/24*** | (2006.01) |

(58) Field of Classification Search
USPC .................. 425/77–78, 353–355, 405.2, 317
See application file for complete search history.

(56) References Cited

U.S. PATENT DOCUMENTS

| | | | | |
|---|---|---|---|---|
| 4,720,256 A * | 1/1988 | Asari | B22F 3/03 425/405.2 |
| 6,802,195 B1 * | 10/2004 | Quint | B30B 11/002 425/405.2 |

FOREIGN PATENT DOCUMENTS

| | | | |
|---|---|---|---|
| JP | 08-118085 | A | 5/1996 |
| JP | 2005-127549 | A | 5/2005 |
| KR | 10-2011-0120129 | A | 11/2011 |

* cited by examiner

COMBINATION APPARATUS OF COLD ISOSTATIC PRESS AND GENERAL PRESS

TECHNICAL FIELD

The present invention relates to a combined cold isostatic press (CIP) and general press which is capable of simultaneously performing a cold isostatic pressing function to isostatically press materials using pressure of fluid and a general pressing function to press materials using pressure of liquid applied to a cylinder.

BACKGROUND ART

There are broadly used two methods, including die pressing and cold isostatic pressing (CIP), upon pressing of powder materials into a given shape.

In die pressing, upper and lower punches and a die are provided, a space between the lower punch and the die is filled with powder, and the filled powder is compressed via reduction in a distance between the upper punch and the lower punch. In this case, friction between the powder and the die causes a pressed article having different upper, middle and lower densities.

In Cold Isostatic Pressing (CIP), when liquid pressure is applied to powder materials sealed in an easily deformable mold, such as a rubber bag, a resultant pressed article uniformly receives press force equal to the liquid pressure throughout a surface thereof and is compressed without directivity.

The aforementioned two pressings are generally performed by different apparatuses. When it is desired to equip both the apparatuses, this will cause increase in cost and an installation area. In particular, production of recent enlarged semiconductor structural ceramics often requires die pressing to be performed first and thereafter requires CIP, and investment of enormous cost is necessary to prepare both apparatuses for production of enlarged structural ceramics.

One prior art example of simultaneous implementation of cold isostatic pressing and die pressing as described above is disclosed in Korean Patent Laid Open Publication No. 10-2011-0120129 entitled “Apparatus for Powder Pressing and Cold Isostatic Pressing”.

The disclosed apparatus for powder pressing and cold isostatic pressing includes: a press unit configured to perform powder pressing; a cold isostatic press unit configured to perform cold isostatic pressing; a base frame on which the press unit and the cold isostatic press unit are mounted; a main frame installed on the base frame so as to be movable between the press unit and the cold isostatic press unit, the main frame serving as a frame for the press unit when aligned with the press unit and serving as a frame for the cold isostatic press unit when aligned with the cold isostatic press unit; and a common single pressurizer configured to apply pressure to the press unit when the main frame is aligned with the press unit and to apply pressure to the cold isostatic press unit when the main frame is aligned with the cold isostatic press unit.

The apparatus for powder pressing and cold isostatic pressing of the prior art, having the above-described configuration, may easily perform general pressing and cold isostatic pressing using both the press unit and the cold isostatic press unit.

However, the apparatus for powder pressing and cold isostatic pressing of the prior art has the following problems.

Firstly, movement of the main frame is required to arouse each process. This causes difficulty in maintaining precision in comparison with adoption of a stationary main frame. Moreover, transportation of such a heavy structure may cause time loss.

Secondly, provision of both the cold isostatic press unit to perform CIP and a hydraulic cylinder to perform die pressing results in increased manufacturing costs and requires different pressure media to apply pressure to both thereof, in turn, a greater number of hydraulic components.

Thirdly, a CIP level for loading and unloading of materials at the top of a pressure vessel differs from a die pressing level for loading and unloading of raw materials and products at a die mounting location, thus causing double staged pressing levels. This is inappropriate in terms of a movement distance of workers and makes it difficult to use transport devices for transportation of dies and products. In addition, since hydraulic components and the like are embedded in a pit below the ground level for implementation of pressing based on the nature of equipment, the invention of the prior art consequently adopts a triple stage structure including a pit level, a die pressing level above the pit level and a CIP level above the die pressing level.

In conclusion, the aforementioned apparatus of the prior art has a complicated structure, thus suffering from difficulty in repair upon occurrence of a breakdown, excessive manufacturing costs and poor management environments.

DISCLOSURE

Technical Problem

Therefore, the present invention has been made in view of the above problems and it is an object of the present invention to provide a combined cold isostatic press and general press in which a single pressure container serves as not only a pressure cylinder required for general pressing, but also a pressure vessel required for cold isostatic pressing, which may result in inexpensive manufacturing costs as well as easy repair upon occurrence of a breakdown owing to a relatively simplified configuration and may also allow a worker who uses the combined cold isostatic press and general press to simultaneously perform two processes at the same working level, thereby achieving enhanced productivity.

Technical Solution

In accordance with an aspect of the present invention, to accomplish the above and other objects, a combined cold isostatic press and general press includes a main frame having a center penetration region, a pressure vessel supported by the penetration region of the main frame, the pressure vessel performing cold isostatic pressing using fluid injected therein, a top lid installed to be vertically slidable from or to an upper end of the pressure vessel by the fluid filled in the pressure vessel so as to function as piston, the top lid being configured to open or close the upper end of the pressure vessel, a lower lid configured to open or close a lower end of the pressure vessel and a press unit located between the top lid and the main frame to perform pressing using pressure applied by the top lid as the top lid slides from the pressure vessel.

The press unit may include an upper bolster coupled to an upper end of the penetration region of the main frame, a lower bolster coupled to an upper surface of the top lid and a first drive mechanism installed to the top lid, the first drive mechanism serving to support the lower bolster and to vertically move the lower bolster.

The press unit may further include a spacer cylinder structure located between the upper bolster and the top lid, the spacer cylinder structure serving to move the lower bolster away from the top lid and an anti-separation block inserted into a space between the lower bolster and the top lid spaced apart from each other by the spacer cylinder structure to prevent the top lid from being separated from the pressure vessel.

The press unit may further include a block movement guide protruding from either side of the lower bolster to guide movement of the anti-separation block.

The pressure vessel may include a bottom plate coupled thereto, the lower lid being coupled to the bottom plate, and the main frame may include a cylinder movement guide protruding outward from the penetration region of the main frame, the cylinder movement guide serving to guide movement of the bottom plate to allow the pressure vessel to be separated from or return to the main frame.

The bottom plate may be provided with a second drive mechanism, and the second drive mechanism may serve to vertically move the lower lid from or to the pressure vessel so as to open or close the pressure vessel.

The bottom plate may be provided with a moving mechanism, and the moving mechanism may serve to move the bottom plate on the cylinder movement guide.

The bottom plate may include a pinion configured to adjust a position of the bottom plate, and the cylinder movement guide may include a rack gear portion engaged with the pinion to guide the bottom plate for accurate positioning of the bottom plate.

The pressure vessel may include a vessel wire wound around the pressure vessel to increase durability of the pressure vessel.

The main frame may include semicircular yokes arranged at upper and lower ends of the main frame to face each other, the yokes serving to distribute pressure applied to the main frame.

The main frame may include a yoke wire wound around the main frame to increase durability of the main frame.

Advantageous Effects

According to the present invention, by fixing a main frame that is the most bulky and heavy component among all constituent components of a combined cold isostatic press and general press and serves as a reference point component and by transporting a pressure vessel that is relatively light and has a low impact on precision, an elaborate and strong combined cold isostatic press and general press may be manufactured.

In addition, owing to a simplified structure to simultaneously perform general pressing and cold isostatic pressing using pressure of fluid injected into a single pressure vessel, easy repair upon occurrence of a breakdown and reduced manufacturing costs may be accomplished.

In addition, by allowing a worker to perform CIP and general pressing at the same working level, several advantages, including increase in productivity, ease in die installation and product transportation and the like, may be accomplished.

In addition, as fluid injected into the pressure vessel for implementation of cold isostatic pressing may be simultaneously used for general pressing, the number of components required to provide hydraulic pressure may be reduced.

Figure 1:
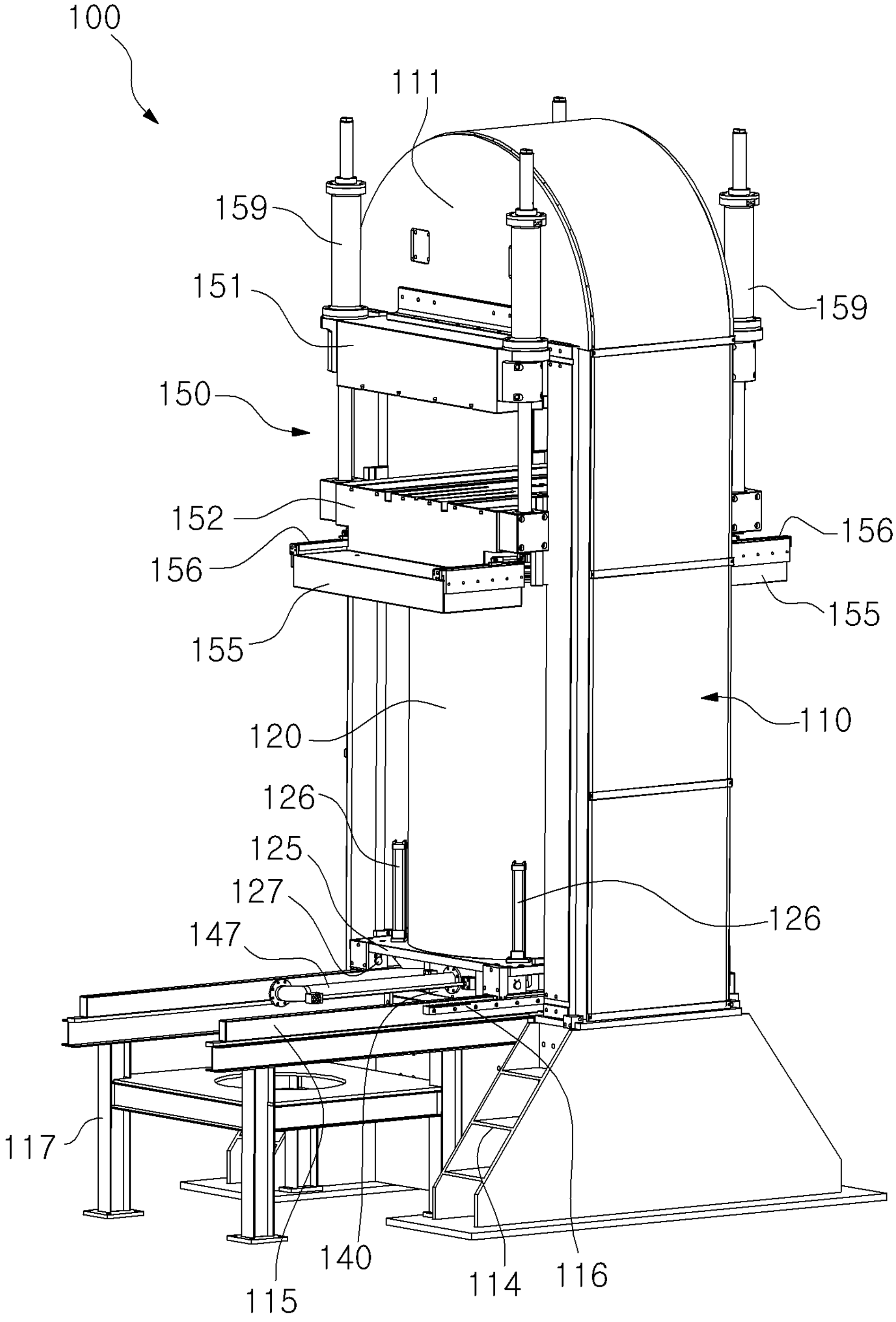
FIG. 1 is a perspective view showing a combined cold isostatic press and general press according to an embodiment of the present invention.

| [Brief Description of Reference Numerals] | |
|---|---|
| 100: combined cold isostatic press and general press, | 110: main frame |
| 111, 112: yokes | 113: yoke wire |
| 114: stairs | 115: cylinder movement guide |
| 116: rack gear portion | 117: post |
| 120: pressure vessel | 121: vessel wire |
| 125: bottom plate | 126: second drive mechanism |
| 127: moving mechanism | 128: pinion |
| 130: top lid | 131: top flange |
| 132, 142: seal members | 133: inlet port |
| 135: check valve | 140: lower lid |
| 141: lower flange | 143: outlet port |
| 145: discharge valve | 147: discharge pipe |
| 150: press unit | 151: upper bolster |
| 152: lower bolster | 153: spacer cylinder structure |
| 153a: piston | 153b: cylinder recess |
| 155: anti-separation block | 156: block movement guide |
| 157: third drive mechanism | 159: first drive mechanism |

BEST MODE

Hereinafter, an embodiment of the present invention will be described in detail with reference to the accompanying drawings.

Figure 2:
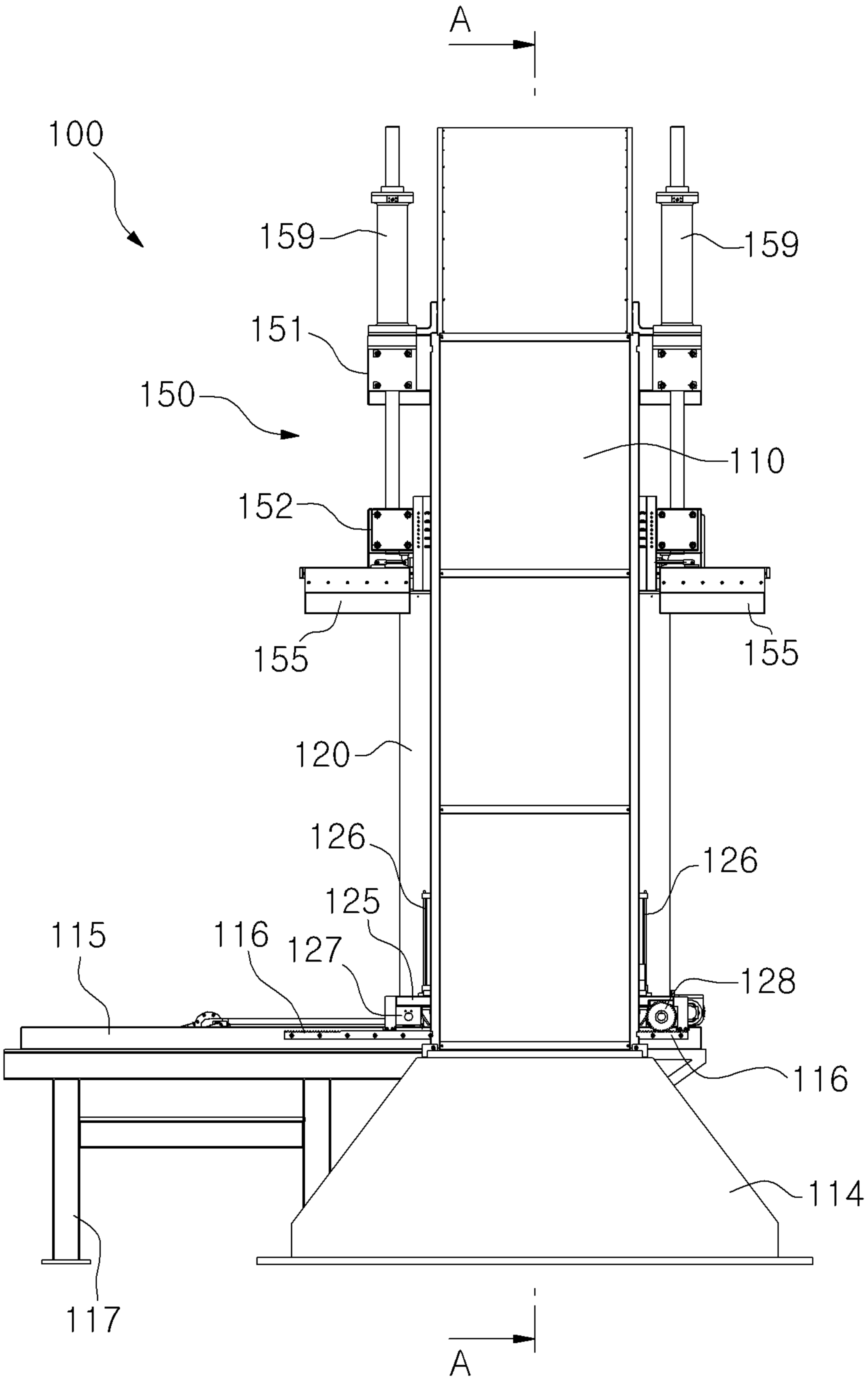
FIG. 2 is a side view showing the combined cold isostatic press and general press according to the embodiment of the present invention.
Figure 3:
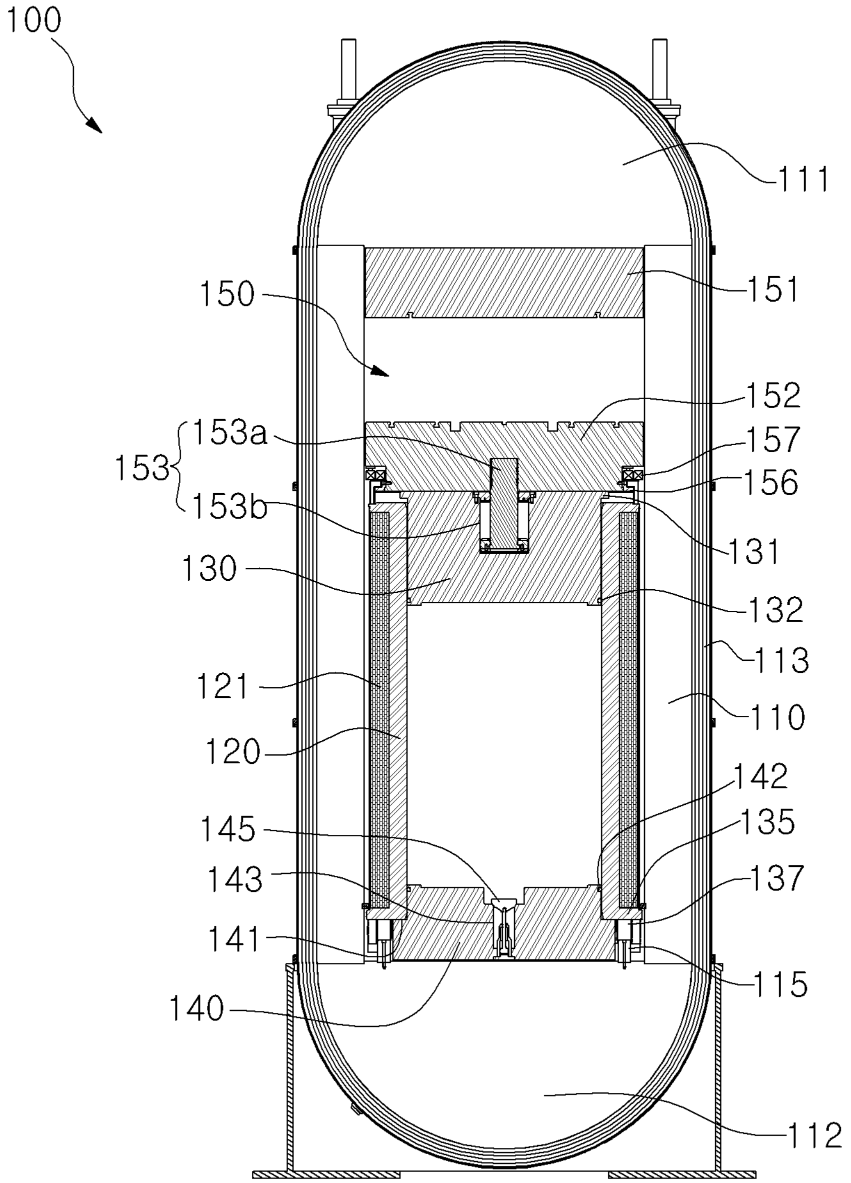
FIG. 3 is a sectional view taken along line A-A of FIG. 2.

As exemplarily shown in FIGS. 1 to 3, a combined cold isostatic press and general press 100 according to the embodiment of the present invention may include a main frame 110.

The main frame 110 may support a top lid 130 and a lower lid 140 to hermetically seal a pressure vessel 120 that will be described below, thereby preventing the top lid 130 and the lower lid 140 from being separated from the pressure vessel 120.

In addition, the main frame 110 may have a center penetration region to allow the pressure vessel 120 to be located in the penetration region.

Meanwhile, the main frame 110 may include yokes 111 and 112 (see FIG. 3).

The yokes 111 and 112 may have a semicircular shape and be installed respectively to upper and lower ends of the main frame 110 in such a way that domed portions of the semicircular yokes 111 and 112 outwardly face in opposite directions.

More specifically, the yoke 111, located at the upper end of the main frame 110, may be configured to support the top lid 130 coupled to an upper end of the pressure vessel 120 inserted in the penetration region of the main frame 110, and the yoke 112, located at the lower end of the main frame 110, may be configured to support the lower lid 140 coupled to a lower end of the pressure vessel 120.

Here, the yokes 111 and 112 have a semicircular shape, which may allow support force exerted by the top lid 130 and the lower lid 140 used to support the pressure vessel 120 to be uniformly distributed rather than being concentrated on any one location, thereby providing increased support force for the top lid 130 and the lower lid 140.

In addition, the main frame 110 may include a yoke wire 113. The yoke wire 113 may be wound around the main frame 110 provided with the yokes 111 and 112 and serve to increase support force of the main frame 110.

More specifically, since the pressure vessel 120 inserted in the penetration region of the main frame 110 may have an internal pressure within a range of about 1000 bar to 7000 bar, the main frame 110 may fail to endure such a pressure and be damaged when formed only of a framework.

Therefore, by winding the yoke wire 113 around the main frame 110, the main frame 110 may exert higher support force to support the pressure vessel 120.

In this case, the yoke wire 113 may be formed of hard steel wires having high tensile strength, aramid (polyaramid), carbon fibers, glass fibers, basalt fibers and the like. Preferably, the yoke wire is a flat steel strip formed by rolling piano wires.

The main frame 110 may further include cylinder movement guides 115. The cylinder movement guides 115 may horizontally extend outward from the penetration region of the main frame 110 in a given direction and serve to guide and move the pressure vessel 120 located in the penetration region of the main frame 110 in the given direction from the main frame 110.

In this case, posts 17 may be installed respectively underneath distal ends of the cylinder movement guides 115 to maintain horizontality of the cylinder movement guides 115 extending from one side of the main frame 110. The cylinder movement guides 115 may take the form of a pair of rails spaced apart from each other.

Figure 4:
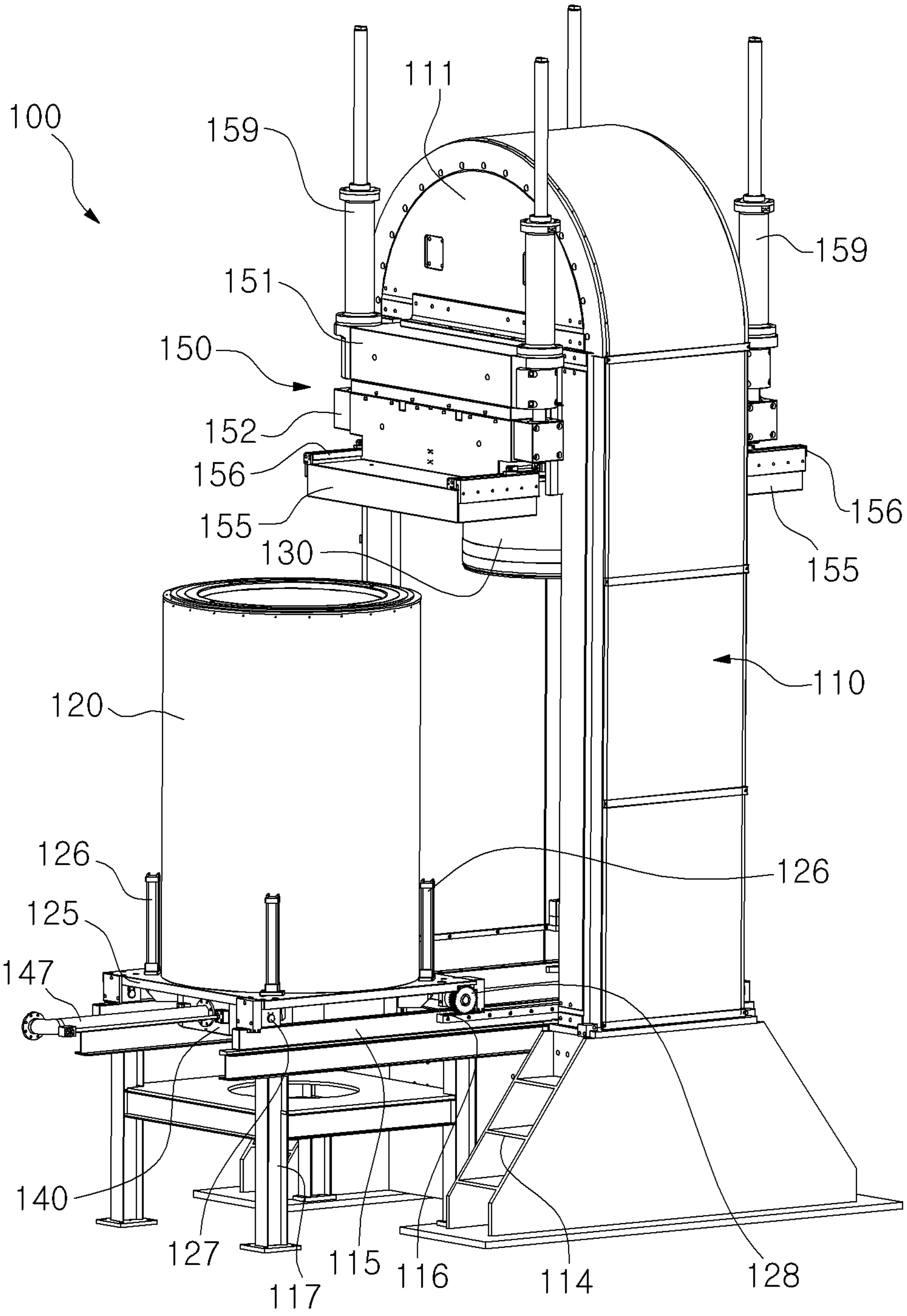
FIG. 4 is a perspective view of the combined cold isostatic press and general press according to the embodiment of the present invention, showing an initial state before pressing.

In addition, each of the cylinder movement guides 115 may have a rack gear portion 116 partially provided with a rack gear (see FIGS. 2 and 4). In the embodiment, the rack gear portion 116 extends from an end of the cylinder movement guide 115, more particularly, an end located in the penetration region of the main frame 110 to the center of the cylinder movement guide 115. The rack gear portion 116 will be described below in detail.

In addition, the main frame 110 may be provided with stairs 114 to assist a worker in easily moving to the penetration region of the main frame 110.

The combined cold isostatic press and general press 100 according to the embodiment of the present invention may include the pressure vessel 120.

The pressure vessel 120 may take the form of a cylinder, into which fluid is injected such that an object to be processed, received in the pressure vessel 120, is subjected to cold isostatic pressing using the same pressure applied in all directions by the fluid injected into the pressure vessel 120.

In this case, the fluid, injected into the pressure vessel 120, may be water or oil. Preferably, the fluid is water containing an anti-rust additive and a lubricant.

Here, cold isostatic pressing is a method of pressing a powder-shaped object to be processed, i.e. ceramic powder into an arbitrary shape by applying pressure to the powder in all directions by fluid. The cold isostatic pressing may be used to press a dense object having a density within a range of 60% to 95%.

Meanwhile, a vessel wire 121 may be wound around the pressure vessel 120 to allow the pressure vessel 120 to endure high pressure of fluid. In this case, like the yoke wire 113 provided at the main frame 110, the vessel wire 121 may be formed of hard steel wires having high tensile strength, aramid(polyaramid), carbon fibers, glass fibers, basalt fibers and the like, and, preferably, is a flat steel strip formed by rolling piano wires.

In addition, the pressure vessel 120 may include a bottom plate 125. The bottom plate 125 may be installed to the lower end of the pressure vessel 120 and provided with a moving mechanism 127. As the bottom plate 125 is moved along the cylinder movement guide 115 by the moving mechanism, the pressure vessel 120 installed to the bottom plate 125 may be moved along the cylinder movement guide 115.

In this case, the moving mechanism 127 may include wheels and a motor. As such, the bottom plate 125 may be moved by drive power of the motor. Alternatively, the moving mechanism 127 may include known hydraulic or pneumatic cylinders interconnecting the bottom plate 125 and the main frame 110 to enable movement of the bottom plate 125 relative to the main frame 110.

Meanwhile, the bottom plate 125 may be provided with a second drive mechanism 126. The second drive mechanism 126 serves to vertically move the lower lid 140, located at the lower end of the pressure vessel 120 that will be described below, in a space below the bottom plate 125. As such, the second drive mechanism 126 may serve to open or close the lower end of the pressure vessel 120.

Here, the second drive mechanism 126 may take the form of a plurality of known pneumatic or hydraulic cylinders arranged at the perimeter of the bottom plate 125.

In the embodiment, the bottom plate 125 has a rectangular shape, and the pneumatic or hydraulic cylinders constituting the second drive mechanisms 126 are installed at respective corners of the bottom plate 125.

In addition, the pressure vessel 120 may include pinions 128 (see FIGS. 2 and 4). The pinions 128 may be installed to the pressure vessel 120, more particularly, the bottom plate 125 used to support the pressure vessel 120. The pinions 128 may be engaged with the rack gear portions 116 of the cylinder movement guides 115 to accurately position the pressure vessel 120 relative to the main frame 110.

In this case, the pinions 128 may be rotated by a motor. The motor for the pinions 128 may be controlled by a sensor installed to the bottom plate 125 so as to appropriately position the pressure vessel 120 relative to the main frame 110.

The combined cold isostatic press and general press 100 according to the embodiment of the present invention may include the top lid 130.

The top lid 130 may be located at the upper end of the pressure vessel 120 to open or close the upper end of the pressure vessel 120.

Meanwhile, the top lid 130 may function as a piston that is inserted into the upper end of the pressure vessel 120 and is vertically slidable by pressure of fluid injected into the pressure vessel 120 from the top of the pressure vessel 120. The top lid 130 may be provided at the perimeter thereof with a top flange 131. The top flange 131 may protrude outward from the top lid 130 to thereby be placed on the upper end of the pressure vessel 120.

In addition, the top lid 130 may have an inlet port 133 through which fluid is injected into the pressure vessel 120 from the outside in a state in which the top lid 130 is coupled to the pressure vessel 120. A check valve 135 may be installed to the inlet port 133 and serve to prevent backflow of fluid within a pressure range of 1000 bar to 7000 bar.

In addition, a seal member 132 may be attached to a portion of the top lid 130 inserted into the pressure vessel 120 and serve to hermetically seal a gap between the pressure vessel 120 and the top lid 130.

The combined cold isostatic press and general press 100 according to the embodiment of the present invention may include the lower lid 140.

The lower lid 140 may be located at the lower end of the pressure vessel 120 to open or close the lower end of the pressure vessel 120.

Meanwhile, the lower lid 140 may be partially inserted into the lower end of the pressure vessel 120 and provided at the perimeter thereof with a lower flange 141. The lower flange 141 may protrude outward from the lower lid 140 to thereby support the lower end of the pressure vessel 120 placed thereon.

In addition, the lower lid 140 may have an outlet port 143 through which fluid injected into the pressure vessel 120 is discharged to the outside in a state in which the lower lid 140 is coupled to the pressure vessel 120. A discharge valve 145 may be installed to the outlet port 143 to selectively discharge the fluid from the pressure vessel 120 to the outside by opening or closing the outlet port 143.

In this case, the discharge valve 145 may be a known discharge valve 145 to open or close the outlet port 143 using pneumatic or hydraulic pressure. The outlet port 143, the discharge valve 145 and a discharge pipe 147 may serve not only to discharge fluid from the pressure vessel, but also to inject fluid into the pressure vessel.

Meanwhile, the discharge pipe 147 may be fitted to the outlet port 143 and serve to discharge fluid from the outlet port 143 to the outside. In consideration of the fact that the pressure vessel 120 is moved along the cylinder movement guides 115, the discharge pipe 147 may be formed by articularly connecting a plurality of pipes to one another, or may be a pliable pipe.

In addition, the lower lid 140 may be connected to the second drive mechanism 126 provided at the bottom plate 125 of the pressure vessel 120 and vertically moved from the lower end of the pressure vessel 120 via operation of the second drive mechanism 126 so as to open or close the pressure vessel 120.

In addition, a seal member 142 may be attached to a portion of the lower lid 140 inserted into the pressure vessel 120 and serve to prevent leakage of fluid.

The combined cold isostatic press and general press 100 according to the embodiment of the present invention may include a press unit 150.

The press unit 150 may be located between the top lid 130 and the main frame 110, more particularly, between the top lid and the yoke 111 located at the upper end of the main frame 110 and serve to perform pressing using compressive force applied by the top lid 130 that is being vertically moved relative to the pressure vessel 120.

Meanwhile, the press unit 150 may include an upper bolster 151 and a lower bolster 152. The upper bolster 151 may take the form of a plate having an arbitrary thickness and be coupled to an upper end of the penetration region of the main frame 110.

In this case, the upper bolster 151 may have a portion formed into a desired shape of an object to be pressed, or a die having a desired shape of an object to be pressed may be installed to the upper bolster 151.

Here, in the case of the upper bolster 151 provided with a die, of course, an upper one of a pair of upper and lower dies may be installed to the upper bolster.

The lower bolster 152 may take the form of a plate having an arbitrary thickness and be coupled to the top of the top lid 130 so as to be vertically moved along with the top lid 130 when the top lid 130 is vertically moved by pressure of fluid within the pressure vessel 120.

Meanwhile, like the upper bolster 151, the lower bolster 152 may have a portion formed into a desired shape of an object to be pressed, or a die having a desired shape of an object to be pressed may be installed to the lower bolster 151.

Here, in the case of the lower bolster 152 provided with a die, of course, a lower one of a pair of upper and lower dies may be installed to the lower bolster.

The press unit 150 may further include a first drive mechanism 159. The first drive mechanism 159 may be installed to the upper bolster 151 to vertically move a lower die located underneath the upper bolster 151. As such, the first drive mechanism 159 may serve to open or close the upper end of the pressure vessel 120 hermetically sealed by the top lid 130 by vertically moving the top lid 130 coupled to the lower die.

Meanwhile, the first drive mechanism 159 may include a plurality of known pneumatic or hydraulic cylinders installed to the upper bolster 151.

In this case, the upper bolster 151 and the lower bolster 152 may have a rectangular shape, and the pneumatic or hydraulic cylinders constituting the first drive mechanisms 159 may be installed at respective corners of the upper bolster 151 to vertically move the lower bolster 152.

The press unit 150 may further include a spacer cylinder structure 153. The spacer cylinder structure 153 may move the lower bolster 152 and the top lid 130 such that the top lid 130 coupled to the lower bolster 152 is spaced apart from or comes into contact with the lower bolster 152.

Meanwhile, the spacer cylinder structure 153 may include a cylinder recess **153*b* formed in the upper bolster 151 and a piston 153*a* installed to the lower bolster 152 such that the piston 153*a* inserted in the cylinder recess 153*b* is vertically moved by pneumatic or hydraulic pressure applied to the cylinder recess 153*b***.

The press unit 150 may further include anti-separation blocks 155. The anti-separation blocks 155 may be inserted between the lower bolster 152 and the top lid 130 to prevent the top lid 130 from being separated from the pressure vessel 120.

More specifically, when the anti-separation blocks 155 are removed from between the lower bolster 152 and the top lid 130, the top lid 130 may be moved toward the lower bolster 152 by a thickness of the anti-separation blocks 155 and, thus, may be separated from the pressure vessel 120.

On the other hand, when the anti-separation blocks 155 are located between the lower bolster 152 and the top lid 130, the anti-separation blocks 155 having a prescribed thickness may limit upward movement of the top lid 130, which may prevent the top lid 130 from being separated from the pressure vessel 120.

Meanwhile, the anti-separation blocks 155 may take the form of a pair of rectangular blocks located respectively at both sides of the top lid 130.

The press unit 150 may further include block movement guides 156. The block movement guides 156 may guide movement of the anti-separation blocks 155 to allow the anti-separation blocks 155 to move to a gap between the top lid 130 and the lower bolster 152 or to be separated outward from the gap between the top lid 130 and the lower bolster 152.

Meanwhile, the block movement guides 156 may protrude from a lower surface of the lower bolster 152 in opposite directions and the anti-separation blocks 155 are suspended respectively from the block movement guides 156. As such, the anti-separation blocks 155 the anti-separation blocks 155 may be located between the lower bolster 152 and the top lid 130 when moved to the center of the respective block movement guides 156, and may be removed from the gap between the lower bolster 152 and the top lid 130 when moved to both sides of the block movement guides 156.

In this case, a third drive mechanism 157 may be installed to the lower bolster 152 and serve to move the anti-separation blocks 155 along the block movement guides 156.

Here, the third drive mechanism 157 may include a plurality of known pneumatic cylinders or hydraulic cylinders.

Operations and effects of the respective components as described above will be described below.

Figure 5:
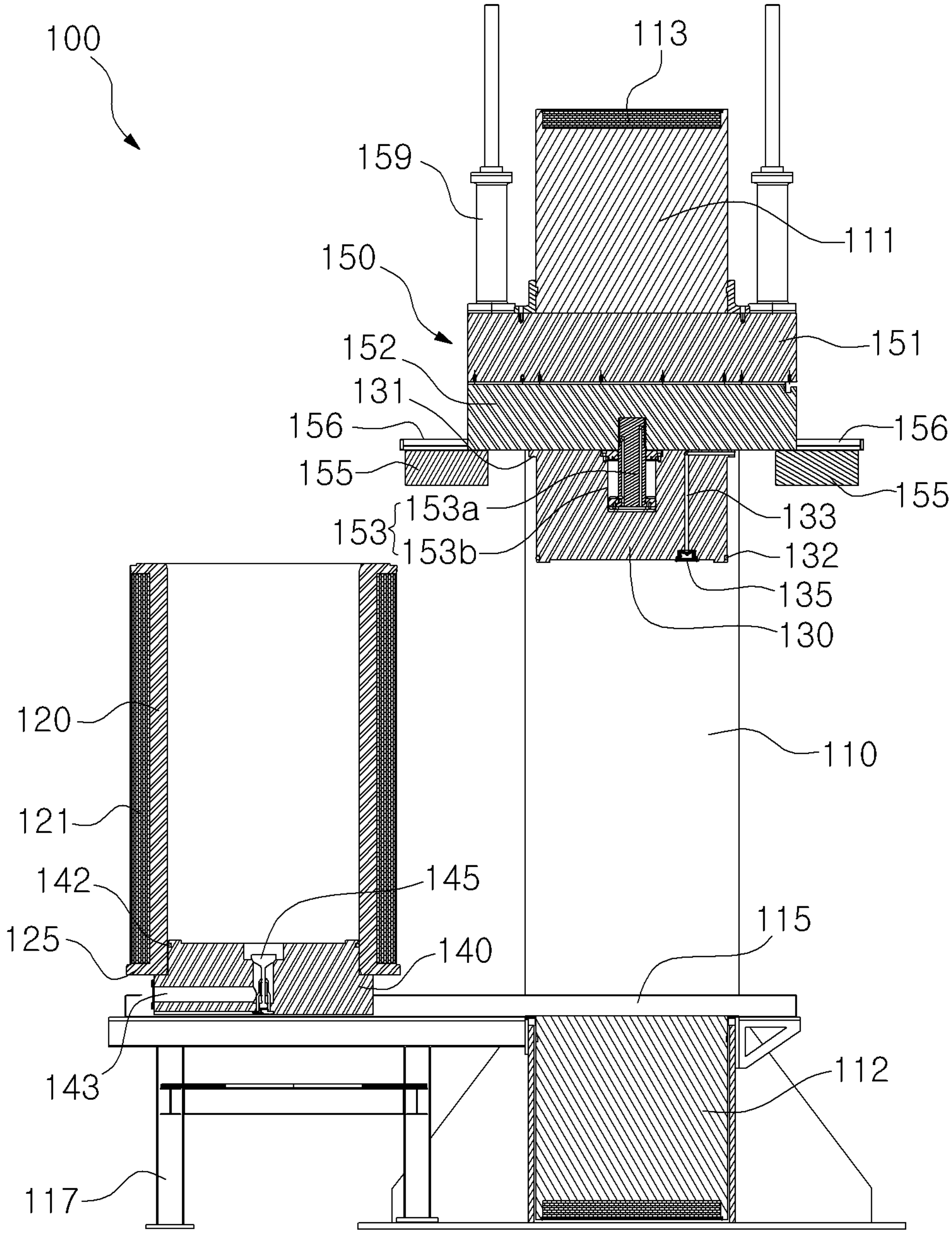
FIG. 5 is a side sectional view of the combined cold isostatic press and general press according to the embodiment of the present invention, showing an initial state before pressing.

First, as exemplarily shown in FIGS. 4 and 5, in the combined cold isostatic press and general press 100, the pressure vessel 120, from which the top lid 130 is opened away, is separated from the penetration region of the main frame 110 and located at an outwardly protruding portion of the cylinder movement guides 115.

In addition, the upper bolster 151 and the lower bolster 152 are located to come into close contact with each other via operation of the first drive mechanism 159, and the anti-separation blocks 155 are located at both sides of the block movement guides 156 rather than being located between the top lid 130 and the lower bolster 152. In such a state, the top lid 130 comes into close contact with a lower surface of the lower bolster 152.

In this case, the lower lid 140 is in an upwardly moved state so as to hermetically seal the lower end of the pressure vessel 120 via operation of the second drive mechanism 126.

In an initial state as described above, an object to be subjected to cold isostatic pressing is input to the pressure vessel 120 through the open upper end of the pressure vessel 120.

Figure 6:
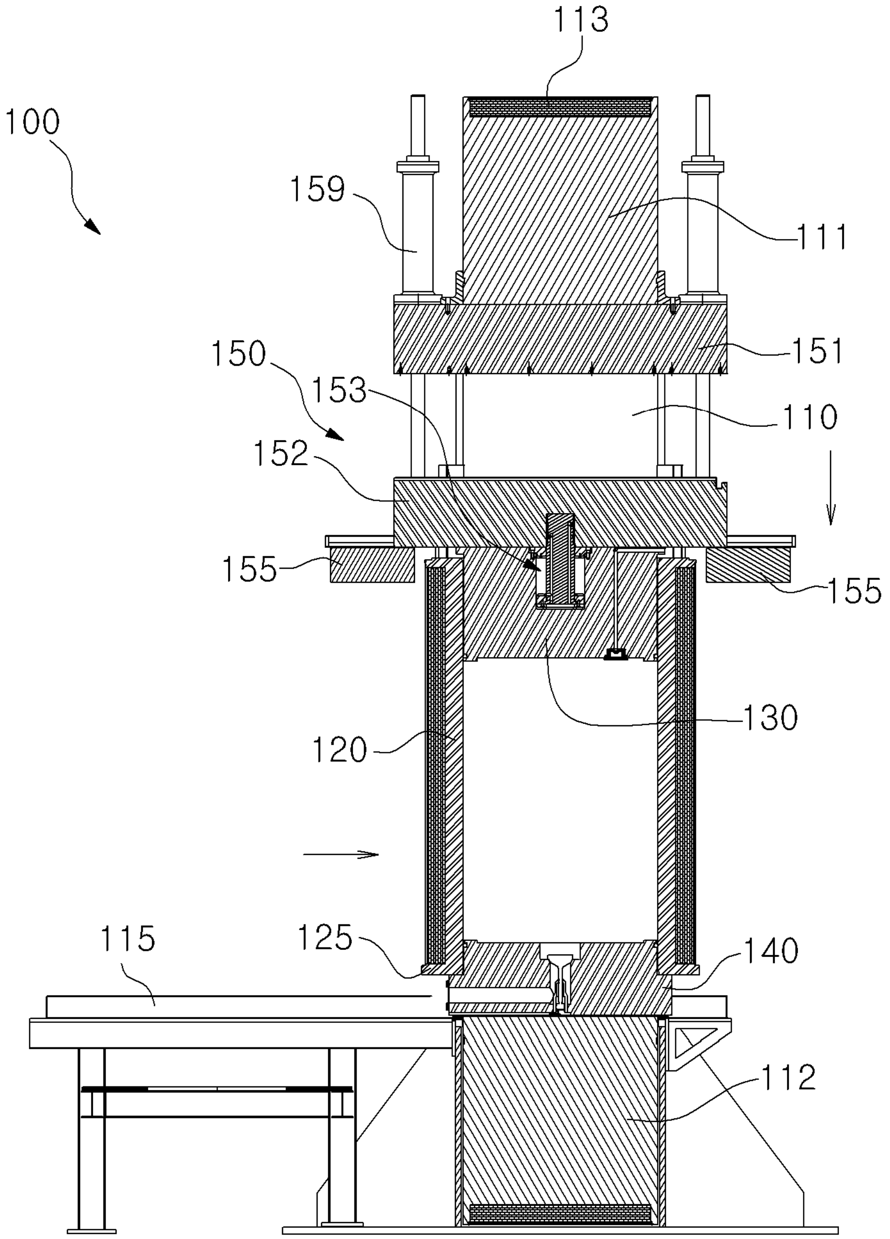
FIG. 6 is a side sectional view of the combined cold isostatic press and general press according to the embodiment of the present invention, showing a state in which a pressure vessel is moved to perform pressing such that a top lid hermetically seals the pressure vessel.

Once the object is input to the pressure vessel 120, as exemplarily shown in FIG. 6, the moving mechanism 127 provided at the bottom plate 125 is operated to move the pressure vessel 120 along the cylinder movement guides 115 to the penetration region of the main frame 110, i.e. to a position immediately below the top lid 130.

In this case, when the pressure vessel 120 approaches near the penetration region of the main frame 110, the pinions 128 provided at the bottom plate 125 are respectively engaged with the rack gear portions 116 of the cylinder movement guides 115. Thereby, through operation of the pinions 128, accurate positioning of the pressure vessel, more particularly, regulating a position of the pressure vessel 120 to allow the top lid 130 to be inserted into the pressure vessel is possible under operation of a sensor (see FIG. 2).

Once the pressure vessel 120 is located below the top lid 130 as described above, the first drive mechanism 159 is operated to allow the top lid 130 to hermetically seal the pressure vessel 120. As such, the lower bolster 152 is moved downward from the upper bolster 151, and an object to be pressed is located between the upper bolster 151 and the lower bolster 152.

In this case, of course, an upper die and a lower die may be installed respectively to the upper bolster 151 and the lower bolster 152 and an object to be pressed may be located between the upper die and the lower die.

Figure 7:
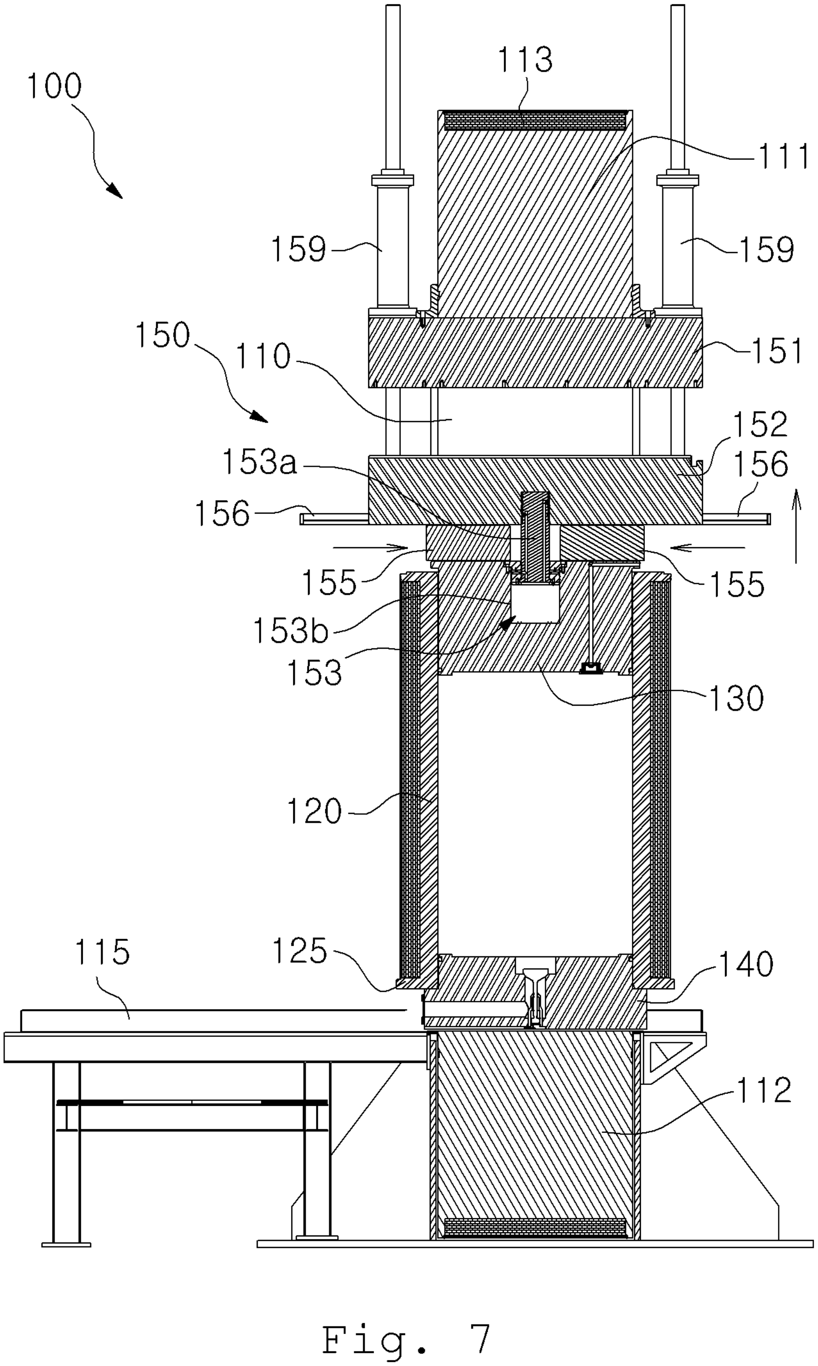
FIG. 7 is a side sectional view of the combined cold isostatic press and general press according to the embodiment of the present invention, showing a state in which a spacer cylinder structure is operated to allow insertion of an anti-separation block therein.

Then, as exemplarily shown in FIG. 7, the spacer cylinder structure 153 interposed between the top lid 130 and the lower bolster 152 is operated to move the lower bolster 152 upward from the top lid 130, and the third drive mechanism 157 is operated to move the anti-separation blocks 155 located at both sides of the block movement guides 156 such that the anti-separation blocks 155 are located between the top lid 130 and the lower bolster 152 spaced apart from each other.

Once pressing of the object is prepared as described above, fluid for use in cold isostatic pressing is injected into the pressure vessel 120 through the inlet port 133 of the top lid 130.

In this case, the fluid may be injected into the pressure vessel 120 via a high-pressure pump to raise an internal pressure of the pressure vessel 120.

Figure 8:
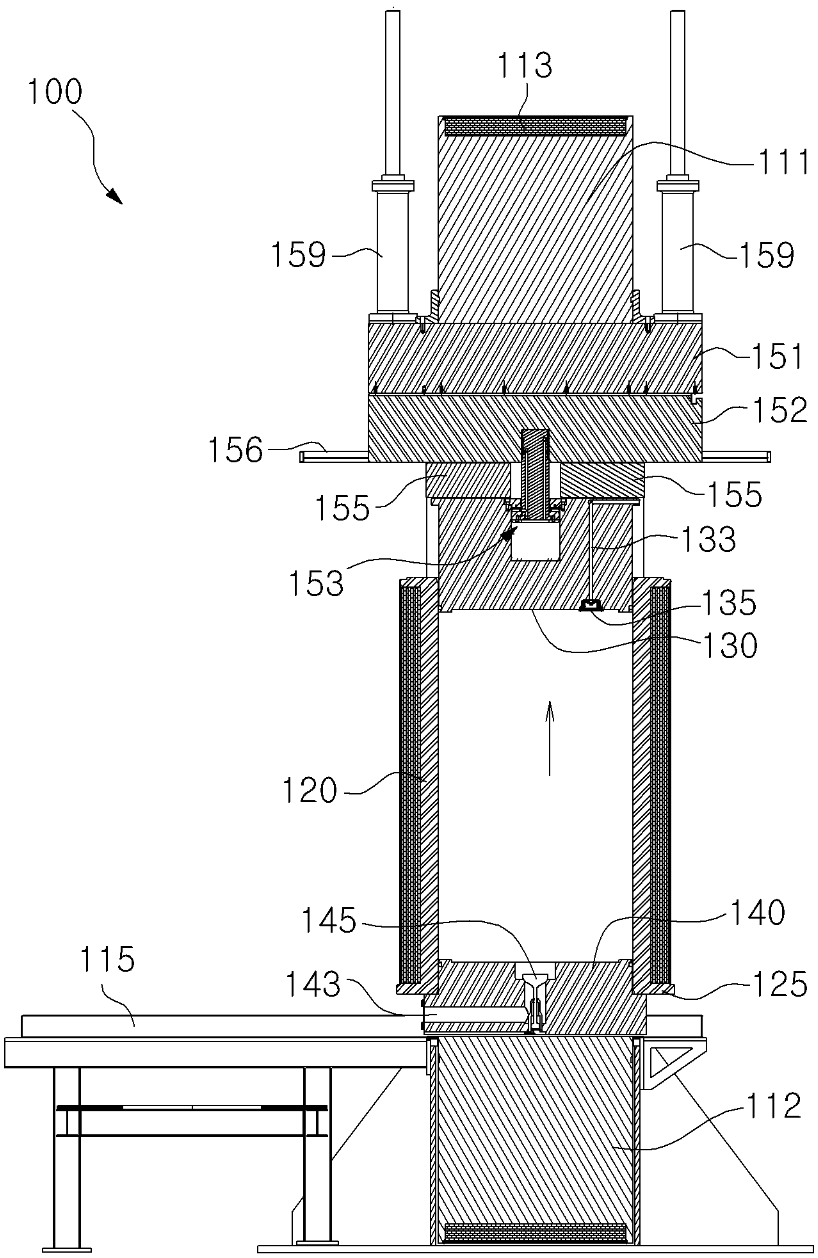
FIG. 8 is a side sectional view of the combined cold isostatic press and general press according to the embodiment of the present invention, showing a state during implementation of cold isostatic pressing and general pressing.

Meanwhile, as exemplarily shown in FIG. 8, when the pressure of the pressure vessel 120 is raised by the fluid supplied into the pressure vessel 120, cold isostatic pressing of the object is performed within the pressure vessel 120 and, simultaneously, the top lid 130 of the pressure vessel 120 is moved upward to apply pressure to the object located between the upper bolster 151 and the lower bolster 152 for implementation of general pressing.

In this case, as compared with a typical known hydraulic press machine that has a size similar to that of the press unit 150 and is operated to apply pressure below 350 bar to a pressure cylinder, the press unit 150 applies significantly greater pressure within a range of 1000 bar to 7000 bar to the object. Therefore, the press unit 150 enables pressing of a denser object than the typical press machine.

Here, the combined cold isostatic press and general press 100 according to the embodiment of the present invention, of course, may not simultaneously perform cold static pressing and general pressing but perform any one of cold static pressing and general pressing.

In addition, to release the pressure of fluid from the pressure vessel 120 after ending pressing, the discharge valve 145 is opened to outwardly discharge the fluid from the pressure vessel 120 through the discharge pipe 147, and the respective components are operated in reverse order of that to perform pressing, thereby returning to the initial state.

Then, in the initial state, the second drive mechanism 126 is operated to open the lower lid 140, thereby completely discharging the fluid remaining in the pressure vessel 120 to the outside.

Figure 9:
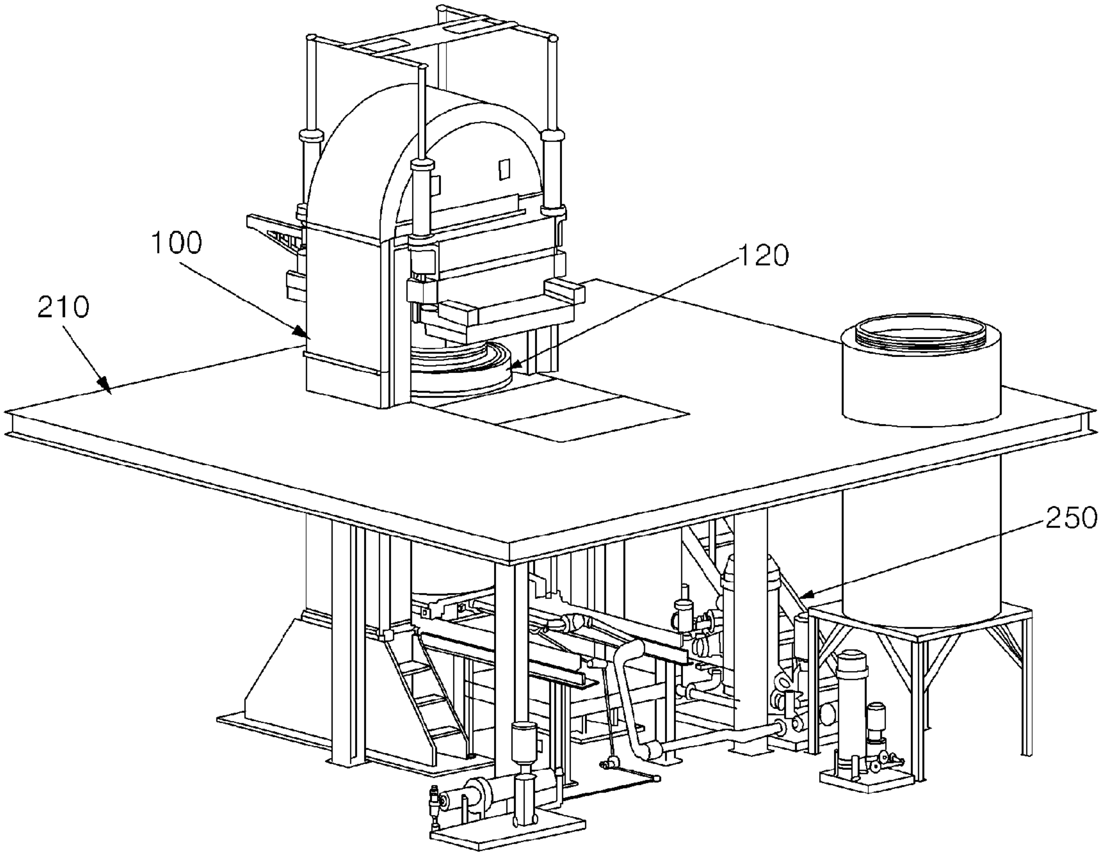
FIG. 9 is a perspective view showing various accessories, such as a pressure generation unit, a mold wash tub, a deck plate defining a working level, inspection stairs between a working level and a pit level, a water reservoir, a filter unit and the like, as well as the combined cold isostatic press and general press according to the embodiment of the present invention.

Meanwhile, as exemplarily shown in FIG. 9, the combined cold isostatic press and general press 100 according to the embodiment of the present invention may include a deck plate 210 installed about the center of the upper end of the pressure vessel 120.

The deck plate 210 defines a working level for a worker. A pit level at which a pressure generation unit, a mold wash tub, a water reservoir, a filter unit, hydraulic components and others are accommodated for easy repair is defined below the deck plate 210, and a ground level at which the worker works is defined above the deck plate 210 (reference numeral 250 designates stairs to allow the worker to go down from the ground level to the pit level for inspection).

Here, the combined cold isostatic press and general press 100 according to the present invention may allow the worker to perform all operations required for cold isostatic pressing and general pressing except for special repair works, for example, loading and unloading of an object to be pressed, at the ground level, which may minimize a movement distance of the worker and, in turn, improve productivity.

Accordingly, the combined cold isostatic press and general press 100 according to the embodiment of the present invention may reduce time required for pressing via simultaneous implementation of cold isostatic pressing and general pressing, and may reduce manufacturing costs owing to a relatively simplified configuration.

In addition, by performing pressing at a pressure (within a range of 1000 bar to 7000 bar) higher than a conventional pressing pressure (generally below 350 bar), pressing of a denser object is possible.

In addition, fluid used in cold isostatic pressing is also used in general pressing, which may minimize consumption of fluid.

In addition, since all operations required for cold isostatic pressing and general pressing are performed at the ground level, a movement distance of workers are minimized, resulting in enhanced productivity.

Although the embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is applicable to the manufacture of dense and uniform products, such as semiconductors, optical lenses, tools and the like.

The invention claimed is:

1. A combined cold isostatic press and general press comprising:

a main frame having a penetration region;

a pressure vessel located in the penetration region and shaped for performing cold isostatic pressing upon a first object inside the pressure vessel using a fluid injected into the pressure vessel;

a top lid installed to be vertically slidable from or to an upper end of the pressure vessel by the fluid filled in the pressure vessel so as to function as a piston, the top lid being configured to open or close the upper end of the pressure vessel, wherein the penetration region of the main frame is located below the top lid;

a lower lid configured to open or close a lower end of the pressure vessel; and a press unit located between the top lid and the main frame to perform pressing using pressure applied by the top lid as the top lid slides upwardly from the pressure vessel, wherein the press unit comprises an upper bolster and a lower bolster, wherein the upper bolster is shaped to receive an upper die, wherein the lower bolster is shaped to receive a lower die such that a second object can be pressed between the upper die and the lower die, and wherein the pressure vessel transmits force through the top lid to the press unit upon receiving the fluid, and wherein the main frame is shaped such that the pressure vessel is horizontally removable without disassembly of the main frame.

2. The combined cold isostatic press and general press according to claim 1, wherein the press unit further includes:

a first drive mechanism installed to the top lid, the first drive mechanism serving to support the lower bolster and to vertically move the lower bolster.

3. The combined cold isostatic press and general press according to claim 2, wherein the press unit further includes:

a spacer cylinder structure located between the upper bolster and the top lid, the spacer cylinder structure serving to move the lower bolster away from the top lid; and an anti-separation block inserted into a space between the lower bolster and the top lid spaced apart from each other by the spacer cylinder structure to prevent the top lid from being separated from the pressure vessel.

4. The combined cold isostatic press and general press according to claim 3, wherein the press unit further includes a block movement guide protruding from either side of the lower bolster to guide movement of the anti-separation block.

5. The combined cold isostatic press and general press according to claim 1, wherein the pressure vessel includes a bottom plate coupled thereto, the lower lid being coupled to the bottom plate, and wherein the main frame includes a cylinder movement guide protruding outward from the penetration region of the main frame, the cylinder movement guide serving to guide movement of the bottom plate to allow the pressure vessel to be separated from or return to the main frame.

6. The combined cold isostatic press and general press according to claim 5, wherein the bottom plate is provided with a second drive mechanism, and the second drive mechanism serves to vertically move the lower lid from or to the pressure vessel so as to open or close the pressure vessel.

7. The combined cold isostatic press and general press according to claim 5, wherein the bottom plate is provided with a moving mechanism, and the moving mechanism serves to move the bottom plate on the cylinder movement guide.

8. The combined cold isostatic press and general press according to claim 5, wherein the bottom plate includes a pinion configured to adjust a position of the bottom plate, and wherein the cylinder movement guide includes a rack gear portion engaged with the pinion to guide the bottom plate for accurate positioning of the bottom plate.

9. The combined cold isostatic press and general press according to claim 1, wherein the pressure vessel includes a vessel wire wound around the pressure vessel to increase durability of the pressure vessel.

10. The combined cold isostatic press and general press according to claim 1, wherein the main frame includes semicircular yokes arranged at upper and lower ends of the main frame to face each other, the yokes serving to distribute pressure applied to the main frame.

11. The combined isostatic press and general press according to claim 1, wherein the main frame includes a yoke wire wound around the main frame to increase durability of the main frame.

12. A combined isostatic press and general press comprising:

a press unit comprising: an upper bolster for receiving an upper die, and a lower bolster for receiving a lower die such that a first object may be pressed between the upper die and the lower die;

a pressure vessel located below the press unit and shaped to receive pressurized liquid for isostatic pressing of a second object within the pressure vessel;

a top lid shaped to slide vertically in a top region of the pressure vessel and shaped to press upwardly, directly or indirectly, against the press unit upon receiving the pressurized liquid;

a main frame wrapping above the press unit, wrapping below the pressure vessel, and shaped to allow the pressure vessel to be removed by a horizontal movement without disassembling the main frame.

13. The combined isostatic press and general press of claim 12, further comprising:

a cylinder movement guide shaped to guide the pressure vessel horizontally out from below the press unit such that a second object may be lowered into the pressure vessel for isostatic pressing.

14. The combined isostatic press and general press of claim 12, wherein the main frame comprises:

a main frame wrapping above the press unit, wrapping below the pressure vessel, and shaped to permit the top lid to press, directly or indirectly, upwardly against the lower bolster such that providing the pressurized liquid to the pressure vessel simultaneously isostatically presses the second object in the pressure vessel and presses the first object in the press unit.

15. The combined isostatic press and general press of claim 12, wherein the main frame comprises:

a substantially straight and vertical left portion;

a substantially straight and vertical right portion;

an upper yoke;

a lower yoke;

a yoke wire wrapped around the upper yoke, the right portion, the lower yoke, and the left portion, a cylinder movement guide for guiding the pressure vessel horizontally out from below the press unit without removing the yoke wire.

16. The combined isostatic press and general press of claim 12, further comprising:

a first drive mechanism shaped to raise the lower bolster upwards towards the upper bolster.

17. The combined isostatic press and general press of claim 12, further comprising:

a cylinder recess located at the center of an upper surface of the top lid; and a piston located in the cylinder recess and shaped to push the lower bolster upwards and away from the top lid.

* * * * *